Aug. 15, 1967

J. S. DAME 3,336,536

SIGNAL GENERATING APPARATUS WITH FREQUENCY
CONTROLLED BY GATING CIRCUIT

Filed Oct. 2, 1964

Inventor
JOHN S. DAME

BY Mueller & Aichele

Attys.

3,336,536
Patented Aug. 15, 1967

3,336,536
SIGNAL GENERATING APPARATUS WITH FREQUENCY CONTROLLED BY GATING CIRCUIT

John S. Dame, Elmhurst, Ill., assignor to Motorola, Inc., Franklin Park, Ill., a corporation of Illinois Filed Oct. 2, 1964, Ser. No. 401,053
6 Claims. (Cl. 331—113)

This invention relates generally to electrical signal generating apparatus, and more particularly to such apparatus which can be controlled to provide a plurality of different frequencies.

It is desired in many applications to provide an electrical signal generator which can be controlled or adjusted to provide different frequencies at different times. For example, a radio receiver of the superheterodyne type requires a local oscillator which is tunable to different frequencies so that the receiver can tune in different received signals. Also, selective signalling systems use different frequencies for different codes, and it may be desirable to use the same signal generator. In prior systems, a frequency controlling element, such as a coil or a capacitor, has been adjusted to provide a change in frequency. It has been common practice to physically move the tuning element to provide the change in frequency.

In some applications electrical control has been used in multi-frequency generators, such as by controlling the current in a saturable reactor or controlling the potential applied to a voltage sensitive capacitor. These systems have been objectionable in that the frequency depends on the power supply voltage, and the frequency stability is limited by the stability of the power supply voltage applied. Further, these systems may cause the frequency to change gradually from one frequency to another, and not rapidly as desired. Another problem has been to provide a signal generator which provides frenquencies varying by steps, and wherein each frequency may be repeated with great accuracy.

It is, therefore, an object of this invention to provide an improved multi-frequency signal generator circuit.

Another object is to provide a multi-frequency generator which can be changed in frequency instantly by electronic means.

A further object of the invention is to provide a multi-frequency signal generator wherein the frequency is dependent only on resistive components and does not vary with power supply voltage.

A feature of the invention is the provision of a multi-frequency signal generator including a voltage controlled multivibrator and an electronic gate circuit for applying different voltages thereto to control the frequency of the oscillator.

Another feature of the invention is the provision of a voltage controlled multivibrator energized from a power supply and including a control transistor, and a voltage divider connected to the power supply for providing control potentials to the control transistor and having a plurality of taps and a plurality of transistor gates connected to the taps and selectively operated to ground the taps to control the voltage applied to the multi-vibrator.

A further feature of the invention is the provision of a voltage controlled multivibrator system as set forth in the preceding paragraphs, wherein the energizing circuits are compensated so that the frequency of the multivibrator is substantially independent of variations in the supply voltage.

The invention is illustrated in the drawing wherein.

Figures 1, 2:
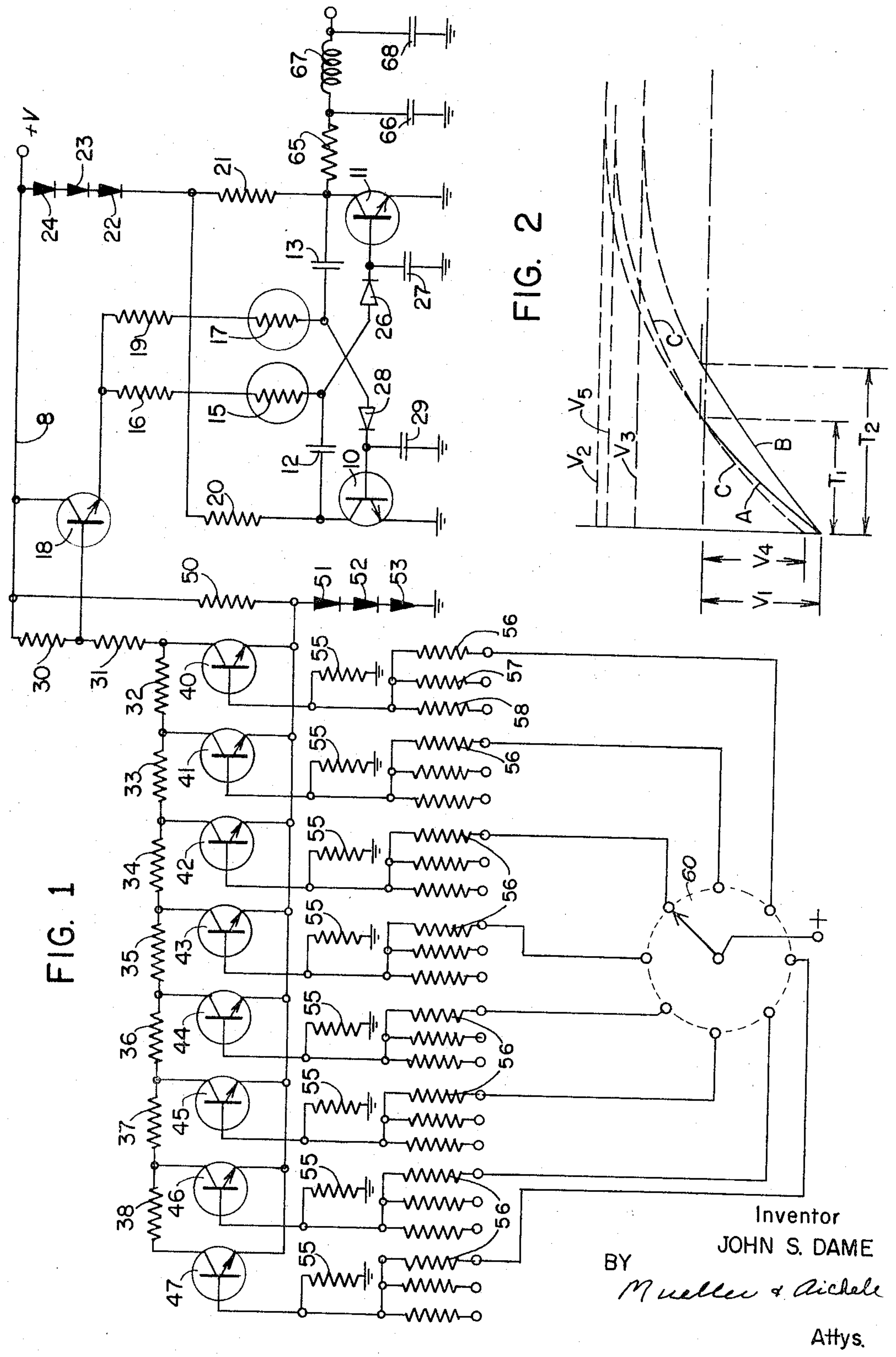
FIG. 1 is a circuit diagram of the signal generator of the invention.
FIG. 2 is a set of curves illustrating the voltage compensating action and the operation of the circuit.

In practicing the invention there is provided a multivibrator circuit which forms the basic signal generator. The frequency of the multivibrator is controlled by the voltage applied to the timing capacitors thereof, and a single transistor controls the voltage in the two circuits. The voltage applied by the control transistor is controlled by potential applied thereto by a voltage divider. The voltage divider has a plurality of taps which are selectively grounded by gate transistors to control the voltage applied to the multivibrator, to thereby control the frequency thereof. Accordingly, by selectively switching the gate transistors, the frequency is controlled in steps. The voltage divider is connected to the same voltage supply line to which the multivibrator is coupled, and the circuit is compensated so that changes in the power supply voltage will not change the frequency. The output of the multivibrator may be filtered to provide a sine wave.

Referring now to the drawing, in FIG. 1 there is shown a multivibrator including transistors 10 and 11. The multivibrator is energized from the positive potential on conductor 8. The period of the multivibrator is controlled by the voltage applied to capacitors 12 and 13 by action of the transistor 18. When transistor 11 is conducting and 10 is non-conducting, capacitor 12 will charge through a first path including resistor 20 and diodes 22, 23, and 24 so that the left terminal of capacitor 12 is at the potential of terminal 8, less the drop in diodes 22, 23 and 24. As transistor 11 is conducting, the right terminal of capacitor 12 is slightly above ground due to the drop through diode 26, and the drop between the emitter and base of transistor 11. The capacitor 12 therefore charges almost to the supply potential.

When transistor 10 is rendered conducting, the left terminal of capacitor 12 is grounded through the collector and emitter electrodes of the transistor. As the left terminal was charged positive with respect to the right terminal, a negative potential now appears on the right terminal. Capacitor 12 will then charge through a second path including resistors 15 and 16 toward the potential of the emitter of transistor 18. Transistor 18 is an emitter follower and its emitter electrode presents a low impedance. The potential at its emitter electrode is dropped below the supply potential applied to its collector electrode and is controlled by the potential applied to its base electrode through a voltage divider circuit which will be described. When the right terminal of capacitor 12 reaches a slightly positive potential, this potential applied through diode 26 to the base of transistor 11 will render this transistor conducting. This action is shown in FIG. 2 wherein the solid curve A shows the charging of capacitor 12 from a negative value up across the zero line to a slightly positive value. The charge curve will stop when the transistor 10 turns on at a slightly positive value.

At the time transistor 11 starts to conduct, capacitor 13 will have charged through resistor 21 and diodes 22, 23 and 24 so that the right terminal of capacitor 13 is at a positive potential almost equal to the supply potential on conductor 8. When the right terminal is grounded through the transistor 11, the left terminal will be at a negative potential. Capacitor 13 will then charge through resistors 17 and 19 toward the potential of the emitter electrode of transistor 18. When the left terminal of capacitor 13 reaches a positive value, this potential applied through diode 28 to the base of transistor 10 will render this transistor conducting. The process will then continue with transistors 10 and 11 being alternately conductive.

Resistors 15 and 17 provide temperature compensation for the capacitors 12 and 13. Capacitors 27 and 29 are provided to eliminate interference in the presence of radio frequency fields and have little effect on the time constants of the switching action.

The voltage at the emitter of transistor 18 is controlled to thereby control the rate of charge of capacitors 12 and 13. A control voltage is applied to the base of transistor 18 by the voltage divider including resistors 30 to 38 inclusive, which are connected in series. Connections or taps are provided at the junctions between adjacent resistors 31 to 38, and these taps are selectively grounded. This will change the voltage applied from the junction of resistors 30 and 31 to the base of transistor 18. As stated above, when transistor 10 starts to conduct, the left terminal of capacitor 12 is grounded, and the voltage at the right terminal is negative with respect to ground. This is shown by the solid line in FIG. 2 wherein the voltage $V_1$ is the voltage across capacitor 12 when transistor 10 starts to conduct. Capacitor 12 will then charge along the solid line A toward the voltage $V_2$ at the emitter of transistor 18. The voltage at the emitter of transistor 18 is dropped and is controlled by the voltage applied to the base. However, as this voltage goes positive the multivibrator will switch, as previously described, and the voltage will not continue to rise. This provides a period $T_1$ for each cycle of the multivibrator.

When the voltage at the emitter of transistor 18 is dropped a lesser amount, the voltage to which capacitor 12 charges when transistor 10 conducts will be smaller and this is shown by the line $V_3$. The capacitor 12 will charge along the line B toward the voltage at the emitter of transistor 18, which is now a lower voltage. Capacitor 12 will reach a positive voltage to cause switching at time $T_2$, which is longer than the time $T_1$. This provides a longer period for the multivibrator, and a corresponding lower frequency.

It will be apparent that any desired number of tap points can be provided on the voltage divider which applies a voltage to the base of transistor 18, as may be desired in a particular application. Also, a plurality of resistors having different values may be connected in parallel, with the resistors selectively grounded to provide different voltages at the base electrode of transistor 18.

For connecting the taps on the voltage divider to ground, switch or gate circuits including transistors 40 to 47 are provided. The collectors of the transistors are connected to the tap points on the voltage divider, and the emitters are all connected together, and to a positive potential provided by resistor 50 and diodes 51, 52 and 53 connected in series from the positive conductor 8 to ground. The diodes will hold the emitter electrodes at a small positive voltage.

The gate circuits are controlled by potentials applied to the base electrodes of the transistors. Each base electrode is connected to ground through a resistor 55 so that when no other potential is applied thereto the transistor is non-conducting, since the emitter is at a positive potential as stated above. Resistors 56, 57 and 58 are connected to each base electrode to apply positive potentials thereto to render the transistors conducting. The resistors 56 of all gate circuits are shown connected to fixed contacts of a switch 60 which has a movable contact connected to a positive potential. As the movable contact engages the various fixed contacts, the transistors connected thereto are rendered conducting. The resistors 57 and 58 connected to the base electrode of each transistor may be connected in other circuits to control the conduction of the transistors as may be desired. For example, one set of resistors may be connected to an electronic scanning switch or other selective device.

When transistor 42 is rendered conducting, the junction between resistors 33 and 34 is connected to the small positive potential across diodes 51, 52 and 53. Accordingly, the voltage divider includes only resistors 30, 31, 32 and 33 and the potential across the diodes. The voltage applied to the base electrode of transistor 18 depends on the relative values of these resistors. In the event that the transistor 44 is rendered conducting, the voltage divider is formed by resistors 30–35 inclusive, and a larger portion of the positive voltage on conductor 8 is applied to the base electrode of transistor 18. When each of the gate circuits including transistors 40 to 47 is conducting, the voltage divider includes a different number of resistors and a different voltage is applied to the control transistor 18.

Inasmuch as the capacitors 12 and 13 of the multivibrator charge from the potential on conductor 8, and the control potential applied to transistor 18 is also derived from this conductor, variations in power supply potential are applied to both the multivibrator and the control circuit. In order that the voltage applied to the base electrode of transistor 18 varies in the same ratio as the voltage applied to the multivibrator, the circuit is arranged so that the same number of diode junctions are present in each circuit. The charging circuits for the capacitors 12 and 13 include the three diodes 22, 23 and 24. The circuit to the base electrodes of the transistors 10 and 11 also include three junctions, the base to emitter junction of control transistor 18, the diode 26 or 28, and base to emitter junction of the transistor 10 or 11. As previously stated, the three diodes 51, 52 and 53 are always in the voltage divider circuit regardless of which gate transistor is actuated. Accordingly, these three circuits are balanced, each having three diode or semiconductor junctions, so that the effective supply voltage is the same in each case, and the voltage divider applies the same ratio of voltage.

The voltage compensating circuit described is effective to provide a frequency which is substantially independent of supply voltage variations. This action is illustrated in FIG. 2 which shows the charging curves of the multivibrator capacitors for different power supply voltages. Although this has been described for capacitor 12, the curves represent the voltage across either capacitor 12 or capacitor 13. When the supply voltage drops, for example, the voltage $V_4$ to which each capacitor charges is less, and when one side is grounded, the negative voltage $V_4$ is less than $V_1$, as shown in FIG. 2. The voltage at the emitter of transistor 18 drops with the supply voltage to the voltage $V_5$, so that the charge rate is less. This controls the time required to provide the voltage at which the transistors switch, and this controls the frequency. This is shown by the dotted curve C in FIG. 2. As the initial negative voltage is less and the charge rate is also less, the time $T_1$ which controls the frequency remains the same.

The system may also be temperature compensated by the use of resistors 15 and 17 having characteristics to compensate for the temperature characteristics of the capacitors 12 and 13. The other components are selected to be as stable as possible with temperature, but are not unduly critical. The temperature characteristics of the diode junctions compensate for each other.

In the event that it is desired to provide a sine wave output from the signal generator, a filter may be connected to the multivibrator. In FIG. 1 the filter is connected to the collector electrode of transistor 11, and is formed by resistor 65, capacitor 66, coil 67 and capacitor 68. Other filter configurations can be used to provide the filtering required to produce the desired wave form.

The multi-frequency generator described has been found to form a very stable source for a plurality of different frequencies. The system is suitable for use in radio remote control systems wherein different frequencies are transmitted to provide different control operations. In order to prevent incorrect operation of controls, it is necessary that the frequencies be extremely accurate and the circuit described provides the desired accuracy.

I claim:

1. Signal generating apparatus for producing a plurality of different frequencies including in combination, potential supply means having first and second terminals, signal generator means energized from said potential supply means for producing a signal having a frequency dependent upon the control voltage applied thereto, voltage divider means having a plurality of resistance portions and terminals connected thereto, said voltage divider means having an end terminal connected to said first terminal of said potential supply means, an intermediate terminal coupled to said signal generator means for applying a control voltage thereto, and a plurality of further terminals connected to said resistance portions on the opposite side of said intermediate terminal from said end terminal, and a plurality of switch means individually connected between said further terminals and said second terminal of said power supply means, said switch means being selectively operative to connect said further terminals to said power supply means to complete the energizing circuit to said voltage divider means and thereby control the voltage at said intermediate terminals thereof, whereby selective operation of said switch means causes the application of different control voltages to said signal generator means so that different frequencies are produced thereby.

2. Signal generating apparatus for producing a plurality of different frequencies including in combination, potential supply means having an energizing terminal and a reference terminal, a multivibrator circuit energized from said potential supply means for producing a signal having a frequency dependent upon the control voltage applied thereto, voltage divider means having a plurality of resistance portions and terminals connected thereto, said voltage divider means having an end terminal connected to said energizing terminal of said potential supply means, an intermediate terminal connected to said multivibrator circuit for applying a control voltage thereto, and a plurality of further terminals on the opposite side of said intermediate terminal from said end terminal, and a plurality of gate means individually connected between said further terminals and said reference terminal of said power supply means, said gate means being selectively operative to connect a particular one of said further terminals to said power supply means to complete the energizing circuit to said voltage divider means and thereby control the voltage at said intermediate terminal, whereby selective operation of said gate means provides different control voltages to said multivibrator circuit so that different frequencies are produced thereby.

3. Signal generating apparatus in accordance with claim 2 wherein each of said gate means includes a transistor having base, emitter and collector electrodes, with said collector electrodes being individually connected to said further terminals of said voltage divider means and said emitter electrodes being connected in common to said reference terminal of said power supply means, and switch means connected to said base electrodes of said transistors for selectively applying potentials thereto for rendering said transistors individually conducting.

4. Signal generating apparatus for producing a plurality of different frequencies including in combination, potential supply means, a multivibrator circuit energized from said potential supply means and including first, second and third transistors and first and second capacitors, circuit means including said transistors providing first and second charge paths for each of said capacitors, said first charge path for each capacitor including a predetermined number of semiconductor junctions connecting said capacitor to said potential supply means, said third transistor having a control electrode and an output electrode connected in said second charge path for each of said capacitors, said circuit means including said predetermined number of semiconductor junctions for compensating said second charge path, voltage divider means having a plurality of terminals and a plurality of resistance portions therebetween, said potential supply means having reference potential means including further semiconductor devices having said predetermined number of semiconductor junctions, and gate circuit means having portions connected to said terminals and to said reference potential means for selectively connecting said resistance portions to said potential supply means, said voltage divider means having an intermediate terminal thereon connected to said control electrode of said third transistor for applying a control voltage thereto, said gate circuit means controlling the connection of said resistance portions to said potential supply means so that different control voltages are applied to said control electrode and said third transistor controls the voltage in said second charge path to thereby control the charge rate of said capacitors so that said multivibrator circuit operates at different frequencies.

5. Signal generating apparatus in accordance with claim 4 wherein said first and second transistors are alternately conducting to complete said first charge path through said first and second capacitors respectively, with said first and second transistors when conducting completing said second charge path through said second and first capacitors respectively.

6. Signal generating apparatus in accordance with claim 4 wherein each portion of said gate circuit means includes a further transistor having base, emitter and collector electrodes, with said collector electrodes being individually connected to terminals of said voltage divider means and said emitter electrodes being connected in common to said reference potential means, and switch means connected to said base electrodes of said further transistors for selectively rendering the same conducting.

References Cited

UNITED STATES PATENTS

| | | | |
|---|---|---|---|
| 3,178,658 | 4/1965 | Henrion | 307—88.5 X |
| 3,222,617 | 12/1965 | Hedlund | 331—113 |
| 3,241,087 | 3/1966 | Gossel | 331—113 |

ARTHUR GAUSS, *Primary Examiner.*

J. JORDAN, *Assistant Examiner.*